US010893724B2

(12) United States Patent
Volk et al.

(10) Patent No.: US 10,893,724 B2
(45) Date of Patent: Jan. 19, 2021

(54) LOCKING MECHANISMS IN ELECTRONIC DEVICES

(71) Applicant: Microsoft Technology Licensing, LLC, Redmond, WA (US)

(72) Inventors: Eric Steven Volk, Sunnyvale, CA (US); David John Huston, Seattle, WA (US); Scott Douglas Bowers, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 583 days.

(21) Appl. No.: 15/801,160

(22) Filed: Nov. 1, 2017

(65) Prior Publication Data
US 2019/0125039 A1 May 2, 2019

(51) Int. Cl.
*A44B 18/00* (2006.01)
*G06F 3/041* (2006.01)
*G06F 3/01* (2006.01)
*F16B 1/00* (2006.01)
*E05B 65/00* (2006.01)
(Continued)

(52) U.S. Cl.
CPC ...... *A44B 18/0096* (2013.01); *A44B 18/0003* (2013.01); *A44B 18/0015* (2013.01); *E05B 47/0009* (2013.01); *E05B 65/0067* (2013.01); *F16B 1/0014* (2013.01); *G06F 1/1637* (2013.01); *G06F 1/1656* (2013.01); *G06F 1/1679* (2013.01); *G06F 3/016* (2013.01); *G06F 3/041* (2013.01); *C08L 2201/12* (2013.01)

(58) Field of Classification Search
USPC .................................. 361/679.29, 679.02
See application file for complete search history.

(56) References Cited

U.S. PATENT DOCUMENTS

| 5,629,662 A * | 5/1997 | Floyd | H01H 71/145 337/36 |
| 6,310,411 B1 * | 10/2001 | Viallet | H01H 61/0107 307/125 |
| 6,598,274 B1 | 7/2003 | Marmaropoulos | |

(Continued)

FOREIGN PATENT DOCUMENTS

JP     2203225     8/1990

OTHER PUBLICATIONS

"International Search Report and Written Opinion Issued in PCT Application No. PCT/US2018/057421", dated Jan. 30, 2019, 13 Pages.
(Continued)

*Primary Examiner* — Rodney E Fuller
(74) *Attorney, Agent, or Firm* — Ray Quinney & Nebeker P.C.; Paul N. Taylor

(57) ABSTRACT

Locking mechanisms and electronic devices having locking mechanisms are described herein. In one example, a locking mechanism includes a latch configured to move between a locked position and an unlocked position, wherein a component of the electronic device is secured in the locked position and removable in the unlocked position. The locking mechanism further includes a memory wire in communication with the latch, wherein the memory wire is configured to contract in length to move the latch between the locked position and the unlocked position to release the component of the electronic device.

20 Claims, 9 Drawing Sheets

(51) Int. Cl.
  *G06F 1/16*    (2006.01)
  *E05B 47/00*   (2006.01)

(56)  References Cited

U.S. PATENT DOCUMENTS

| | | | | |
|---|---|---|---|---|
| 6,745,330 | B1 * | 6/2004 | Maillot | E05B 73/0082 |
| | | | | 70/51 |
| 6,843,465 | B1 | 1/2005 | Scott | |
| 7,406,846 | B2 * | 8/2008 | Chu | E05B 47/0009 |
| | | | | 70/278.1 |
| 7,600,301 | B2 * | 10/2009 | Rudduck | F16B 1/0014 |
| | | | | 24/602 |
| 7,610,783 | B2 * | 11/2009 | Rudduck | F16B 21/186 |
| | | | | 70/277 |
| 8,217,903 | B2 | 7/2012 | Ma et al. | |
| 8,827,331 | B2 | 9/2014 | Corcoran et al. | |
| 9,261,926 | B2 | 2/2016 | Larsen et al. | |
| 9,274,560 | B2 | 3/2016 | Ahn | |
| 9,277,789 | B2 | 3/2016 | Galu, Jr. | |
| 9,314,885 | B2 | 4/2016 | Chen et al. | |
| 9,430,077 | B2 | 8/2016 | Shedletsky et al. | |
| 9,618,973 | B2 | 4/2017 | Bergmann et al. | |
| 9,740,245 | B2 * | 8/2017 | Gault | G06F 1/1662 |
| 9,785,196 | B1 | 10/2017 | Bowers et al. | |
| 2003/0173863 | A1 * | 9/2003 | Butera | E05B 79/20 |
| | | | | 310/307 |
| 2004/0066713 | A1 * | 4/2004 | Liu | G11B 33/128 |
| | | | | 369/30.38 |
| 2005/0183479 | A1 * | 8/2005 | Alacqua | E05B 47/0009 |
| | | | | 70/277 |
| 2005/0252260 | A1 * | 11/2005 | Chu | E05B 47/063 |
| | | | | 70/278.7 |
| 2007/0132551 | A1 * | 6/2007 | Mozer | G07C 9/33 |
| | | | | 340/5.52 |
| 2007/0193267 | A1 | 8/2007 | He | |
| 2013/0141345 | A1 | 6/2013 | Wang | |
| 2014/0193193 | A1 | 7/2014 | Wikander et al. | |
| 2016/0279862 | A1 | 9/2016 | Larsen et al. | |
| 2017/0030109 | A1 * | 2/2017 | Duncan | E05B 17/2011 |
| 2017/0097663 | A1 | 4/2017 | Gault et al. | |
| 2017/0308127 | A1 | 10/2017 | Hillyerd et al. | |
| 2020/0116136 | A1 * | 4/2020 | Naly | E05B 47/0009 |

OTHER PUBLICATIONS

Limer, Eric, "A Look Inside the Clever Mechanism That Makes Microsoft's Surface Book So Cool", http://www.popularmechanics.com/technology/gadgets/a18050/ifixit-teardown-shows-surface-book-mechanism/, Nov. 3, 2015, 8 pages.

R. Velazquez et al., "Toward Low-Cost Highly Portable Tactile Displays with Shape Memory Alloys", Applied Bionics and Biomechanics, 2007, pp. 57-70, vol. 4, No. 2.

* cited by examiner

LOCKING MECHANISMS IN ELECTRONIC DEVICES

BACKGROUND

Current design trends for electronic devices such as tablet computers, display devices, or mobile phones include designs having an increase in power, a decrease in size (e.g., height, length, and/or width), and an increase in speed. As the size of the electronic device is reduced, certain internal device components may be positioned closer together. This provides for challenges in manufacturing design.

For example, in certain commercial examples, a display screen may be adhered to a chassis of an electronic device (e.g., tablet computer). Such adhesive retention solutions, while low-profile, induce display failure at high rates when disassembled. Alternative, low-profile solutions that attempt to address disassembly failure require time-costly manual mechanisms.

SUMMARY

Locking mechanisms and electronic devices having such locking mechanisms are described herein. In one or more embodiments, a locking mechanism, configured to be positioned within an electronic device includes a latch configured to move between a locked position and an unlocked position, wherein a component of the electronic device is secured in the locked position and removable in the unlocked position. The locking mechanism further includes a memory wire in communication with the latch, wherein the memory wire is configured to contract in length to move the latch between the locked position and the unlocked position to release the component of the electronic device.

In another embodiment, a locking mechanism includes a latch having a first segment, a second segment, and a third segment connecting the first and second segments. The locking mechanism also includes a retention bracket configured to be attached to a substrate of the electronic device, wherein a segment of the retention bracket is positioned between the first and second segments of the latch, and wherein the first segment of the latch is positioned between the segment of the retention bracket and the substrate. The locking mechanism also includes a memory wire in communication with the latch, wherein the memory wire is configured to contract to move the latch along an axis in a direction of the contraction of the memory wire to release a component of the electronic device having a segment of the component positioned between the retention bracket and the second segment of the latch.

In another embodiment, an electronic device includes a display module, a chassis, and a retention bracket positioned between the display module and the chassis, wherein the retention bracket is attached to the chassis. The electronic device also includes a latch configured to move along a groove provided by the retention bracket between a locked position and an unlocked position, wherein the display module is secured in the locked position and removable in the unlocked position. The electronic device also includes a memory wire in communication with the latch, wherein the memory wire is configured to contract to move the latch along the groove in a direction of the contraction of the memory wire.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
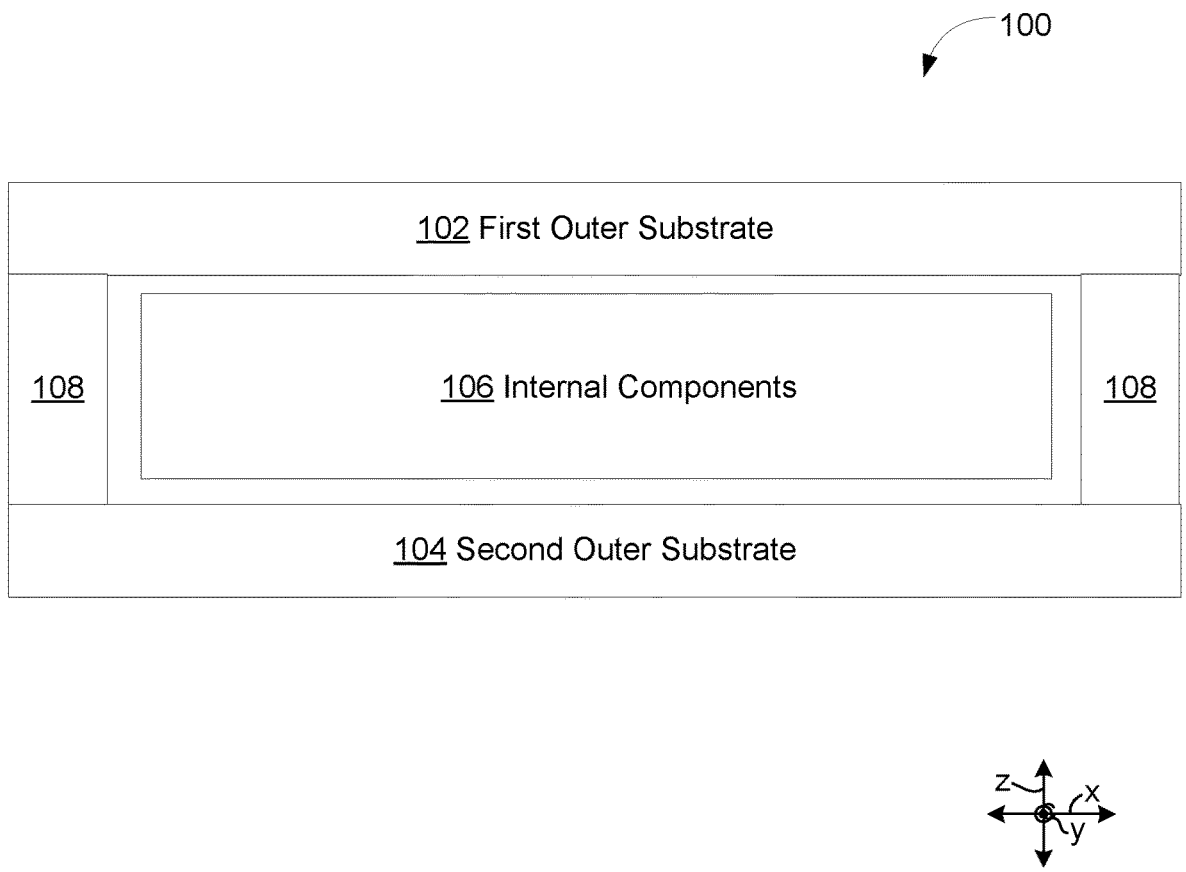
FIG. 1 depicts an example of a cross-sectional side view of an electronic device.
Figure 1:
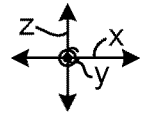

While the disclosed devices and systems are representative of embodiments in various forms, specific embodiments are illustrated in the drawings (and are hereafter described), with the understanding that the disclosure is intended to be illustrative, and is not intended to limit the claim scope to the specific embodiments described and illustrated herein.

DETAILED DESCRIPTION

As used herein, "muscle wire" or "memory wire" may refer to a wire configured to constrict when heat or electrical current is applied to the wire and retract/expand to its original shape when the heat or electrical current is removed from the wire.

Locking mechanisms having memory wire and electronic devices having such locking mechanisms are described herein. Such locking mechanisms with memory wire have several potential end-uses or applications, including handheld electronic devices. Specifically, a mechanical latch with memory wire may be advantageous in being able to construct an electronic device with minimal real-estate. That is, the installation of the locking mechanism within an electronic device may have a minimal height or thickness difference of the device in comparison to a similar electronic device without the locking mechanism. Additionally, or alternatively, the installation of the locking mechanism within an electronic device may have a similar or smaller border width or length in comparison to a similar electronic device without the locking mechanism, as the compared electronic device may require adhesive materials to secure the components in place, whereas less or no adhesive materials may be required in the device with the locking mechanism.

At the same time, the locking mechanism is advantageous in providing streamlined ease-of-detachment and reduced electronic device failure rates. In other words, the use of memory wire to drive or move a mechanical latch may reduce or eliminate the use of an adhesive material to adhere an outer layer or surface (e.g., a display screen) of the electronic device to the chassis or intermediate layer of the device. By reducing or eliminating the use of adhesive materials, the outer surface (e.g., display screen) may be mechanically removed from the remainder of the electronic device by moving the mechanical latch with the memory wire without damage to the device components. This may be advantageous in reducing repair or rework costs, as the time required to repair the electronic device may be reduced and the number of damaged components may also be reduced.

The locking mechanism may be incorporated into any electronic device with at least one external surface configured to be safely removed from the remainder of the electronic device. Non-limiting examples of electronic devices include personal computers (PCs), server computers, tablet and other handheld computing devices, laptop or mobile computers, communication devices such as mobile phones, multiprocessor systems, microprocessor-based systems, set top boxes, programmable consumer electronics, network PCs, minicomputers, mainframe computers, or audio or video media players. In certain examples, the electronic device may be a wearable electronic device, wherein the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or head-mounted display.

Various non-limiting examples of locking mechanisms and electronic devices including the locking mechanisms are described in greater detail below.

FIG. 1 depicts a cross-sectional view of an electronic device 100 configurable to include a locking mechanism. The electronic device 100 includes a first outer layer or substrate 102. The first outer substrate 102 may be a display screen or display module. The display module 102 may be a touch display module. The display module 102 may include a light-emitting device such as a liquid crystal display (LCD) or a light emitting diode (LED) (e.g., an organic light emitting diode (OLED)). The LCD or LED may be disposed in, or configured as, a film. The configuration, construction, materials, and other aspects of the light emitting devices may vary. For instance, III-V semiconductor-based LED structures may be used to fabricate micron-sized LED devices. The small thickness of such structures allows the light emitting devices to be disposed in planar arrangements (e.g., on or in planar surfaces) and thus, distributed across the viewable area of the display. Non-LED technologies, such as finely tuned quantum dot-based emission structures, may also be used. Other thin form factor emission technologies, whether developed, in development, or future developed, may be used within the display module 102.

The electronic device 100 further includes a second outer substrate 104. The second outer substrate 104 is positioned on an opposite or rear end of the electronic device 100 such that the first outer substrate 102 (e.g., the display screen) and the second outer substrate 104 (e.g., backing layer) bookend the internal components 106 of the electronic device. The first and second outer substrates may be connected to each other via borders 108 or sides of the electronic device. In some examples, the borders 108 may be an extension of the first or second outer substrate. In other examples, the borders 108 are separate outer substrates of the electronic device.

In some examples, the second outer substrate 104 may be a backing layer or chassis. The backing layer may be made of any variety of materials now known or later developed such as metals, plastics, polymers, ceramics, or combinations thereof. The backing layer, for instance, may be formed from one or more sub-layers of a polymer or mixture of polymers. For example, the backing layer may be formed from polymers such as thermoplastic polymers, silicones, or polyurethanes. In some examples, the backing layer is formed from a polyurethane laminate, where a cloth fabric is laminated onto a thin film of polyurethane.

In alternative examples, the second outer substrate 104 may be a display screen or display module as described above with reference to the first outer substrate 102.

Positioned between the first outer substrate 102 and the second outer substrate 104 are the internal components 106 of the electronic device 100. One internal component may be a circuit board or motherboard. The circuit board may be a printed circuit board or a flexible circuit board. The circuit board may be configured to hold and allow communication between one or more central processing units (CPUs), graphics processing units (GPUs), and memories. The circuit board may also be configured to provide connections to sound cards, video cards, network cards, hard drives, or other forms of storage. The circuit board may also be configured to provide connections to one or more peripherals (e.g., a keyboard, mouse, serial port, parallel port, Firewire/IEEE 1394a, universal serial bus (USB), Ethernet, audio). The circuit board and its connected components (e.g., CPU) may provide a source of the heat generated during operation of the electronic device (i.e., a heat source).

Another internal component within the electronic device 100 is the battery. In certain examples, the electronic device may include a plurality (i.e., 2 or more) of batteries. The battery may be any type of battery now known or later developed. In certain examples, the battery is a secondary or rechargeable battery (e.g., a metal ion or metal air battery such as a lithium air or lithium ion battery). In some examples, the battery may be in the same plane as the motherboard (e.g., the same x-y plane). In other examples, the battery may be in a different plane from the motherboard, wherein the battery plane is parallel with the motherboard plane (e.g., the x-y plane of the battery is at a different z height from the x-y plane of the motherboard).

The electronic device 100 may include additional internal components between the first outer substrate 102 (e.g., display module) and the second outer substrate 104 (e.g., backing layer). For example, the electronic device 100 may include an active cooling source (e.g., a fan). As used herein, "active cooling" may refer to the use of forced fluid movement (e.g. fans moving air or pumps moving water) to reduce the heat of a component (e.g., a microprocessor) of the electronic device. Active cooling contrasts with "passive cooling," which utilizes non-forced methods of cooling such as natural convection or radiation or involves reducing the speed at which a component (e.g., a microprocessor) is running to reduce the component's heat. The fan, when active, may drive air through areas or channels within the internal area of the electronic device to assist in removing heat from the electronic device.

An additional internal component of the electronic device 100 may be at least one locking mechanism, which is configured to assist in the removal of the first outer substrate or the second outer substrate from the remainder of the electronic device 100. In some examples, the electronic device 100 includes a plurality of locking mechanisms, wherein each locking mechanism is configured to assist in the removal of a substrate from the remainder of the electronic device 100. For example, the electronic device 100 may include two locking mechanisms, wherein a first locking mechanism is configured to assist in the removal of the first outer substrate 102 and a second locking mechanism is configured to assist in the removal of the second outer substrate 104. Each locking mechanism may be similar or different from the additional locking mechanisms within the electronic device. The locking mechanisms may be individually activated or activated in a group.

Figure 2:
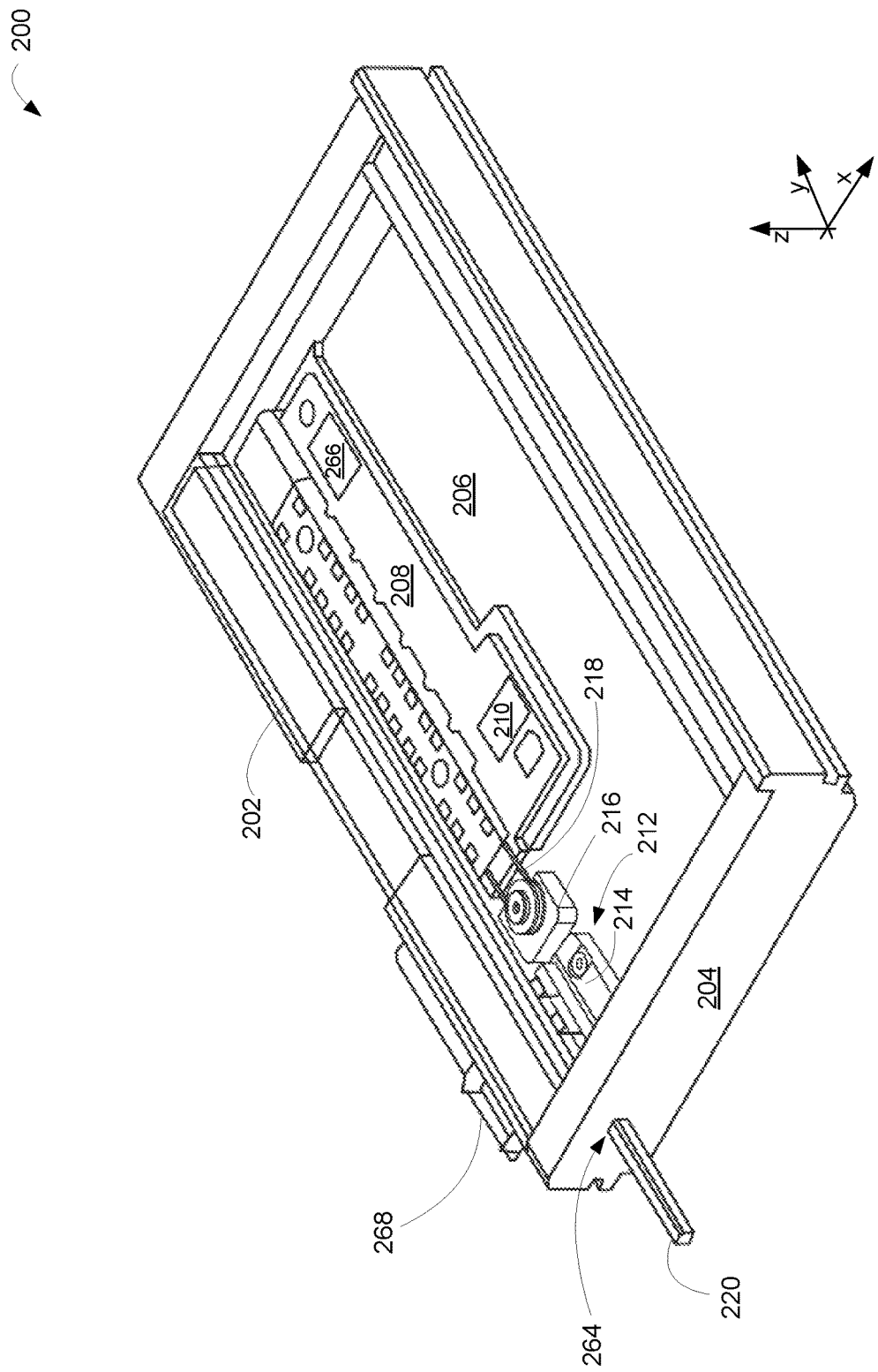
FIG. 2 depicts an example of an isometric view of an electronic device having a locking mechanism.
Figure 3:
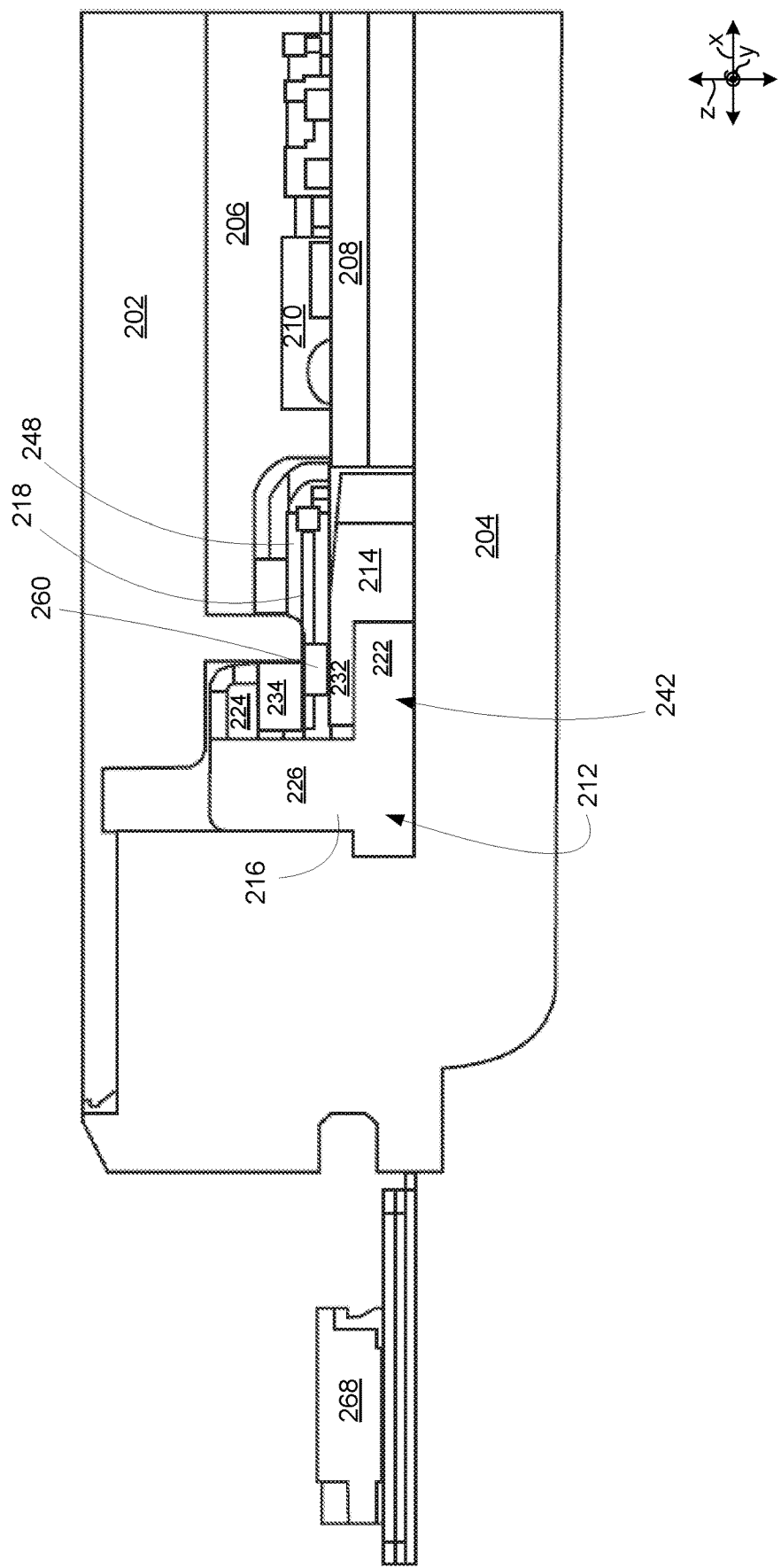
FIG. 3 depicts an example of a cross-sectional side view of various components of an electronic device having a locking mechanism.
Figure 4:
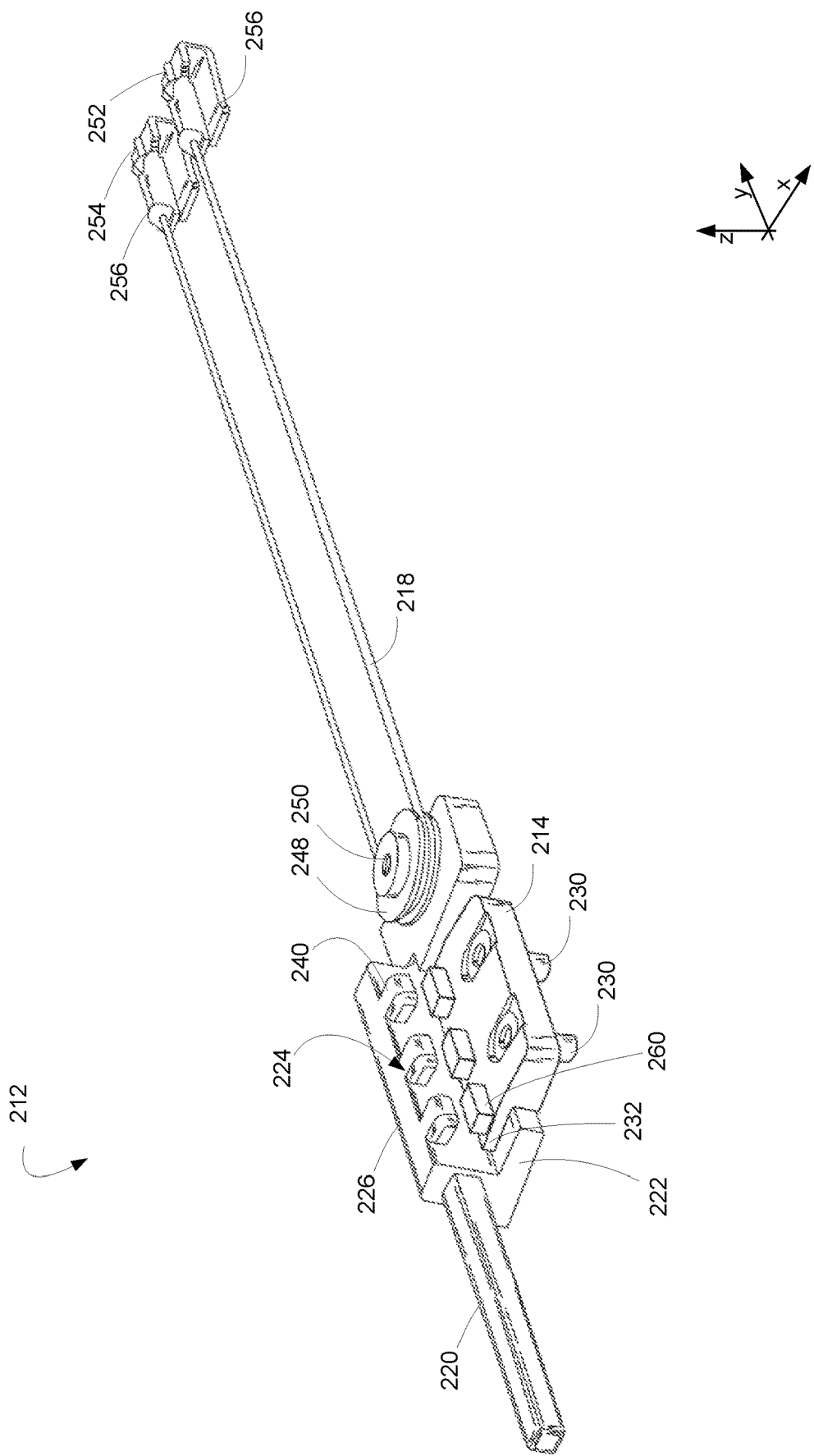
FIG. 4 depicts an example of an isometric view of various components of a locking mechanism.
Figure 5:
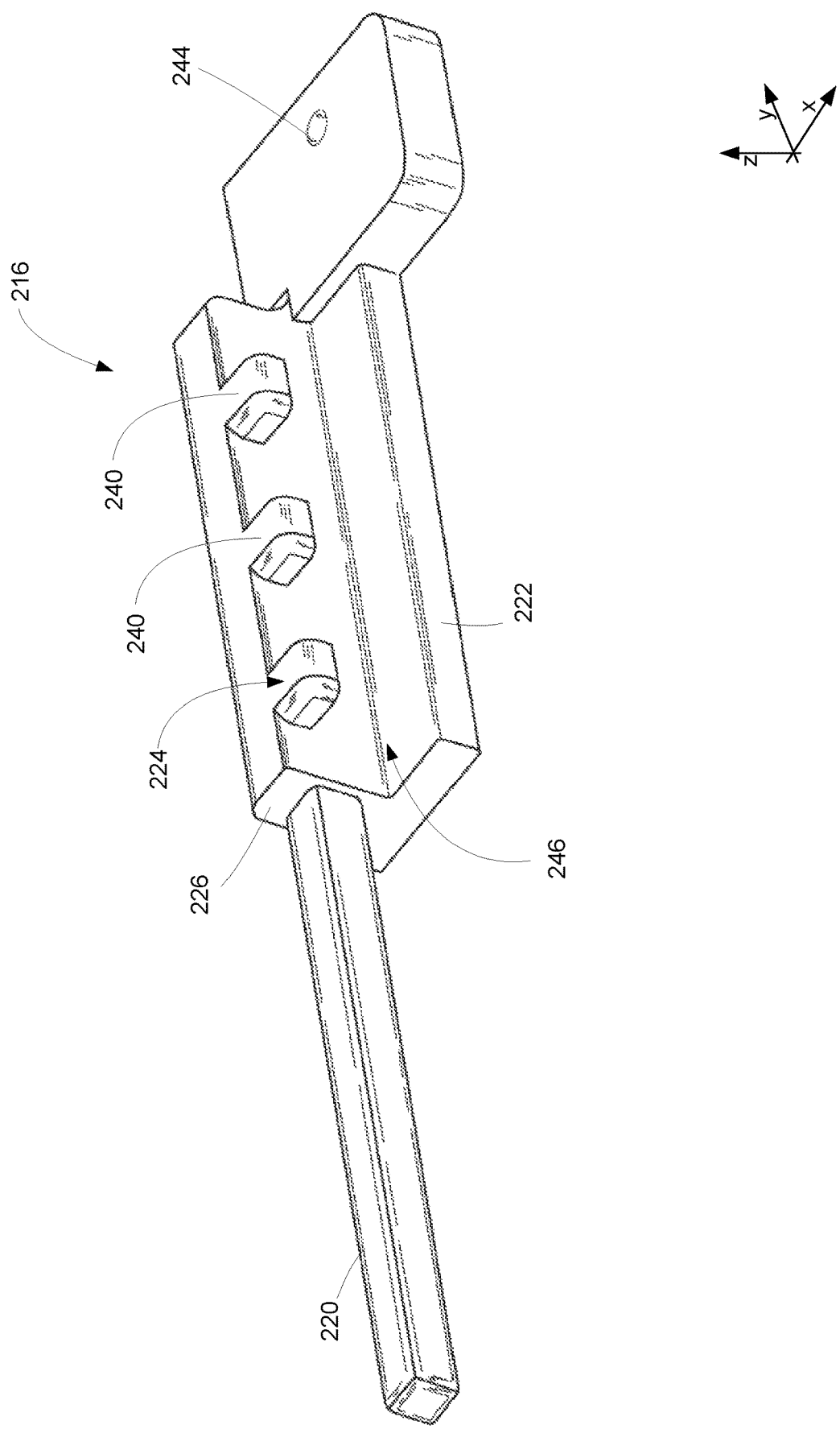
FIG. 5 depicts an example of a latch component of a locking mechanism.
Figure 6:
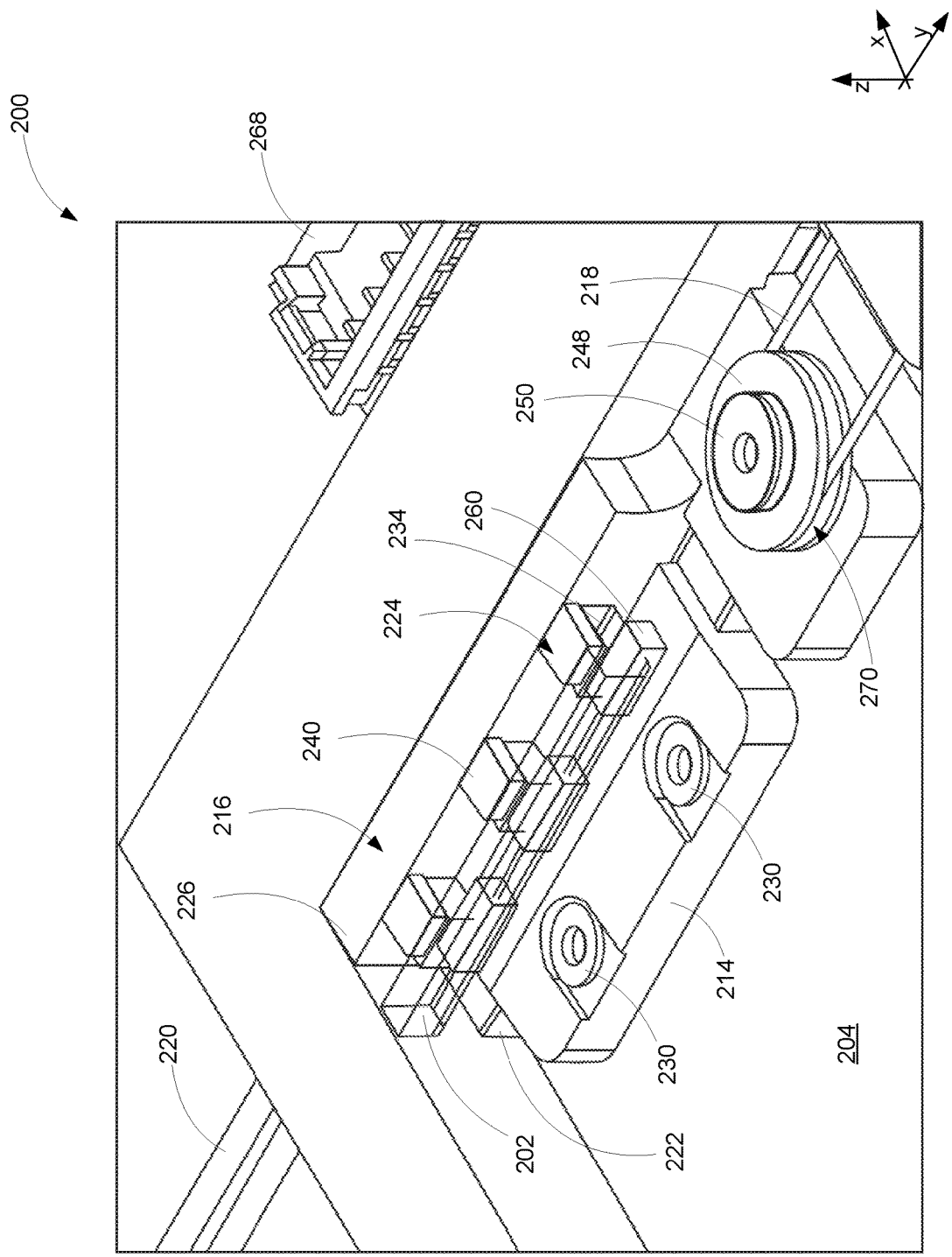
FIG. 6 depicts an example of an isometric view of various components of a locking mechanism positioned within an internal cavity of the electronic device.
Figure 7B:
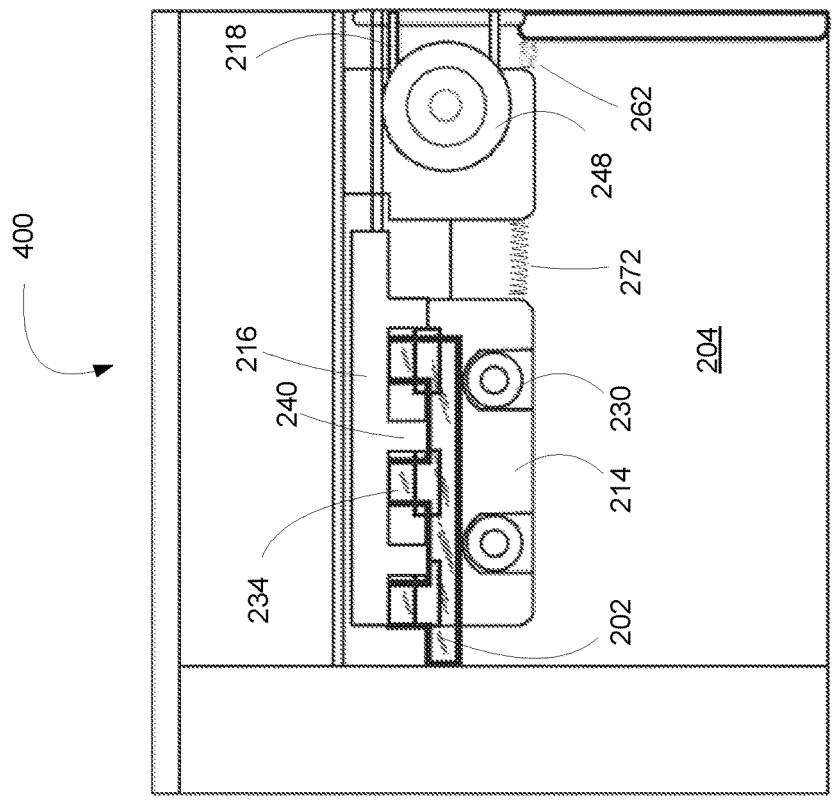
FIG. 7B depicts the components of the electronic device in an unlocked position.

FIGS. 2-7B depict various views and components of an electronic device 200 including a locking mechanism positioned within the internal cavity of the electronic device 200. FIG. 2 depicts an isometric view of the electronic device 200, while FIG. 3 depicts a cross-sectional side view of the electronic device 200 having the locking mechanism. FIG. 4 depicts an isometric view of various components of the locking mechanism. FIG. 5 depicts an isometric view of the latch component of the locking mechanism. FIG. 6 depicts an additional isometric view of various components of the locking mechanism positioned within an internal cavity of the electronic device. FIG. 7A depicts an example of top-down view of components of the electronic device in a locked position 300, and FIG. 7B depicts the components of the electronic device in an unlocked position 400.

The electronic device 200 includes a display module 202 and a chassis 204 that, when adjoined with each other, provide an internal cavity 206 of the electronic device. A plurality of internal components is provided within the cavity 206 of the electronic device 200. For example, as discussed above, a motherboard or circuit board 208 is provided. The circuit board 208 may include one or more processors 210 configured to operate the electronic device. Additionally, one or more batteries may be positioned within the cavity to provide a power source for operation of the device.

A locking mechanism 212 is depicted in one corner of the internal cavity. The positioning of the locking mechanism 212 is configurable to any location within the internal cavity 206. The locking mechanism 212 may include a latch 216 configured to move between a locked position and an unlocked position, wherein a component (e.g., an outer substrate such as a display module 202) of the electronic device is secured in the locked position 300 and removable in the unlocked position 400. For example, the display module 202 may include one or more retaining elements or hooks 234 extending from or attached to an inner surface of the display module 202 that are positionable within an area of the locking mechanism 212 such that the latch 216 secures the segments 234 of the display module 202 and prevents the display module 202 from being removed from the electronic device 200 when the locking mechanism 212 is in a locked position 300. When the locking mechanism 212 is moved into an unlocked position 400, the retaining elements or hooks 234 attached to or extending from a surface of the display module 202 are free to move upward (along the z-axis), and the display module 202 is configured to be removed from the electronic device 200. The retaining elements or hooks 234 may be adhered to, extruded from, or otherwise attached to an internal surface of the display module 202.

In certain examples, the latch 216 is configured to move along an axis (e.g., along the y-axis) provided by a groove 242 within the internal cavity of the electronic device that is configured to retain the latch 216 from moving along a separate axis (e.g., the x- or z-axis). The groove may be provided in a substrate of the electronic device, such as the chassis 204. In another example, the groove 242 is provided by a retention bracket 214, discussed in greater detail below.

The latch 216 may include a first segment 222, a second segment 224, and a third segment 226, wherein the third segment 226 connects the first segment 222 and second segment 224.

The first segment 222 of the latch 216 is positioned in the groove 242 created by the area between the substrate (e.g., chassis 204) and a segment 232 of the retention bracket 214. This is advantageous in minimizing or eliminating undesired movement of the latch in certain directions (e.g., along the x- or z-axis), while allowing the latch to slide linearly along the y-axis to move between a locked position and an unlocked position.

Figure 7A:
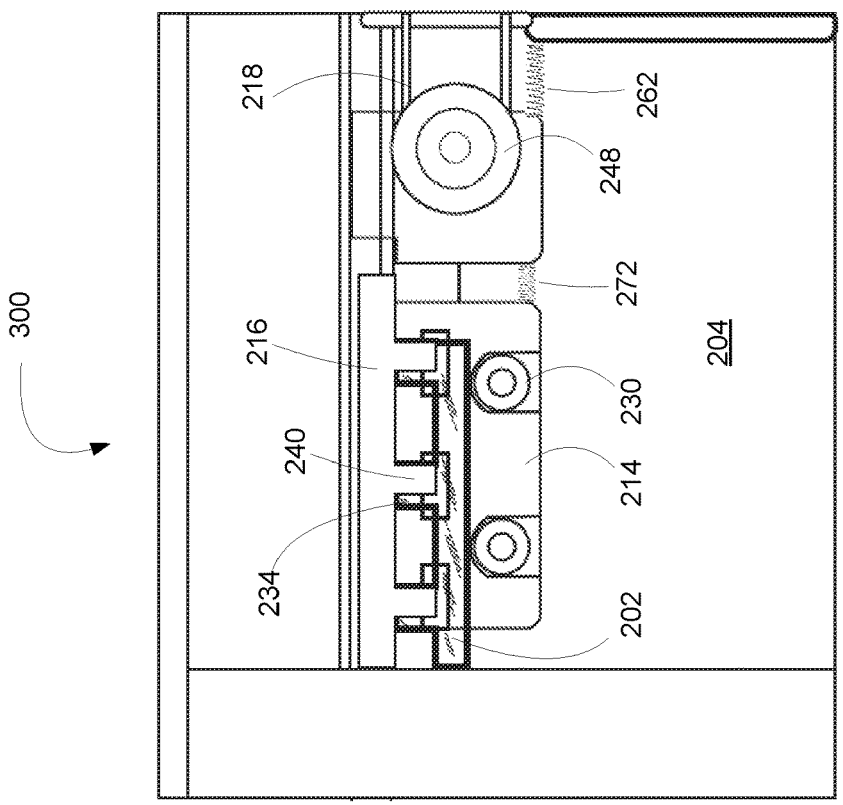
FIG. 7A depicts an example of top-down view of components of an electronic device in a locked position.

The second segment 224 of the latch 216 is configured to retain a component of the electronic device when the latch 216 is in a first, locked position 300 and release the component of the electronic device when the latch 216 is moved into a second, unlocked position 400 (as depicted in FIGS. 7A and 7B).

The second segment 224 includes one or more retaining elements 240 (e.g., a hook or a plurality of hooks) that extend from the third segment 226 of the latch in a perpendicular direction (e.g., the x-axis) to the axis of movement of the latch (e.g., the y-axis). Each retaining element 240 (e.g., hook) is configured to restrict the release of the component (e.g., outer substrate) when the latch 216 is in the locked position 300. Additionally, each hook 240 is configured to allow the release of the component (e.g., display module) 202 when the latch 216 is moved along the axis into the unlocked position 400.

The retaining elements or hooks 240 may have curved outer edges positioned adjacent to the display module 202. This is advantageous in avoiding a sharp outer edge near the display module 202 to prevent damage to the display module 202 during reinsertion of the display module 202 following its removal and repair or replacement.

The latch 216 also may include an opening or notch 244 or connector configured to receive the memory wire 218 of the locking mechanism 212, or a component in communication with the memory wire 218. In certain examples, the notch 244 is an opening or hole in a segment of the latch 216 configured to receive the memory wire 218 or a post or other connection element in communication with the memory wire 218 (such as depicted in FIG. 5).

The composition of the latch 216 may be any known or later developed material. For example, the latch 216 may be made of a metallic or polymeric composition. In some examples, the latch 216 includes one or more metals or metal alloys such as aluminum, copper, iron, lead, magnesium, molybdenum, nickel, osmium, palladium, platinum, rhenium, rhodium, ruthenium, sliver, steel, tantalum, thorium, titanium, vanadium, or alloys thereof. Additionally, or alternatively, the latch 216 may include one or more polymers such as a thermoplastic polymer composition.

The dimensions or size of the latch 216 are also configurable based on the dimensions of the internal cavity of the electronic device 200. For example, the width and length of the latch 216, as measured along the x-axis and y-axis, respectively, may be within a range of 0.1-200 mm, 1-100 mm, 10-50 mm, 0.1-10 mm, or 1-10 mm. The height of the latch 216, as measured along the z-axis, may be within a range of 0.01-20 mm, 0.1-10 mm, 0.1-5 mm, 1-5 mm, or 0.1-1 mm.

The size (e.g., height) of the gap or opening 246 between the first segment 222 of the latch 216 and the second segment 224 of the latch 216 (as measured along the z-axis) is also configurable based on the combined height of the components positioned between two segments (e.g., a segment of the retention bracket 214 and/or an extension of the outer substrate 202).

The dimensions of the retaining elements 240 (e.g., hooks) are also configurable. Specifically, the width of each hook, as measured along the y-axis, is configured to be wide enough to provide strength to retain the component (e.g., outer substrate) when the latch 216 is in the locked position 300, but narrow enough to not impede removal of the component (e.g., display module 202) when the latch 216 has moved into the unlocked position 400. In other words, the width of each hook is less than the length of movement of the latch 216 between the locked position 300 and the unlocked position 400. For example, if the latch 216 moves 10 mm between the locked position 300 and the unlocked position 400 (as measured along the y-axis), the width of each hook 240 is configured to be less than 10 mm to allow the segments of the outer substrate (e.g., the display module 202) positioned beneath the hooks 240 to be removed from the electronic device 200.

In addition to the latch 216, the locking mechanism 212 also includes a memory wire 218 configured to assist in moving or sliding the latch 202 along an axis to release a component of the electronic device 200. The memory wire 218 is configured to contract and expand in size to move or slide the latch 216 along an axis (e.g., the y-axis) to move the latch 216 between the locked position 300 and the unlocked position 400. In the locked position 300, a portion or extension of the component or outer substrate (e.g., display module 202) is retained or locked in place with the remainder of the electronic device components. This locked position 300 represents the position in which the electronic device 200 is configured to routinely operate. In the unlocked position 400, the outer substrate (e.g., display module 202) may be removed from the remainder of the electronic device 200.

The memory wire 218 may be connected directly with the latch 216 or may be connected indirectly with the latch 216 via an intermediate component. In one example, the memory wire 218 is in communication with the latch 216 via a wheel 248 attached to one end of the latch 216 via a bolt or nut 250. The memory wire 218 loops around a groove 270 of the wheel 248 such that the first end 252 and second end 254 of the memory wire 218 are attached to the substrate of the electronic device 200 or an internal component of the electronic device 200. As depicted in FIG. 4, for example, the first and second ends 252, 254 may be attached to the substrate or internal component via connectors 256 (e.g., hooks or latches) attached to the ends 252, 254 of the memory wire 218. The first and second ends 252, 254 of the memory wire 218 may be soldered, adhered, tied to, or otherwise joined with the connectors 256.

In alternative examples, the ends 252, 254 may be directly attached to the substrate or an internal component of the electronic device 200 via soldering or tying the ends 252, 254 to the substrate or internal component (such as a post or wheel).

In an alternative example, the memory wire may be a single linearly arranged wire having one end tied, soldered, hooked, or otherwise connected to the substrate or internal component of the electronic device, and the second end tied, soldered, hooked, or otherwise in communication with the latch of the locking mechanism (e.g., via a post connected to the latch).

The memory wire 218 may be made out of any material now known or later developed that is configured to contract and expand based upon receipt of a thermal or electrical load on the wire 218. For example, upon the application of heat or electrical current, the memory wire 218 may transition from one phase or crystal structure to another phase, and change in size (e.g., constrict/contract in size). Upon removal of the heat or current, the memory wire 218 may transition or return to its original shape. Heat could be applied via a heat source (e.g., processor, battery, or integrated circuit) or an electrical current. The electrical current may be applied directly to the wire to generate heat via the closing of a circuit.

In certain examples, the memory wire 218 is a shape-memory alloy or alloy that "remembers" is original shape and that, when deformed, returns to its pre-deformed shape. The memory wire 218 may include one or more of copper, aluminum, nickel, titanium, zinc, gold, iron, magnesium, silicon, or alloys thereof. In certain examples, the memory wire 218 is a copper-aluminum-nickel alloy, a nickel-titanium alloy, an iron-magnesium-silicon alloy, or a copper-zinc-aluminum alloy.

The composition and length of memory wire 218 are also configurable based on the dimensions of the internal cavity of the electronic device 200 and the desired length of movement to slide the latch 216 between the locked position and the unlocked position. For example, if the latch 216 needs to move at least 10 mm to allow a component (e.g., outer substrate or display module 202) of the electronic device 200 to be removed, then the composition and length of memory wire 218 is chosen such that the memory wire 218 will contract at least 10 mm over its length when a certain amount of thermal or electrical load is applied to the memory wire 218.

In certain examples, the locking mechanism 212 may also include a retention bracket 214. The retention bracket 214 may be attached to a substrate of the electronic device 200. The substrate may be an outer substrate (such as the backing layer or chassis 204) of the device. Alternatively, the substrate may be an internal substrate or layer that itself is secured in place (e.g., via attachment to an outer substrate such as the chassis).

In certain examples, a screw or bolt 230 is provided to connect the retention bracket 214 to the chassis 204. Alternative connection devices or materials such as nails, pegs, or rivets are also possible. Additionally, or alternatively, an adhesive layer may be positioned between the retention bracket 214 and the substrate (e.g., chassis 204) to secure the two components to each other.

The retention bracket 214 may be coupled with the latch 216 such that the latch 216 is configured to slide along an axis (e.g., the y-axis, as depicted in FIGS. 2-4 and 6) within a groove 242 provided by the retention bracket 214. The retention bracket 214 is configured to minimize or prevent the latch 216 from moving in another direction (e.g., along the x-axis or z-axis). In other words, while the retention bracket 214 minimizes the movement of the latch 216 along an axis (e.g., z-axis), the retention bracket 214 is configured to guide movement of the latch 216 along a perpendicular axis (e.g., y-axis) to assist in unlocking and releasing a component of the electronic device.

The retention bracket 214 may include a segment 232 that is positioned between a portion of the latch 216 and the substrate (e.g., chassis 204). The segment 232 of the retention bracket 214 is positioned such that a first segment 222 of the latch 216 is between the segment 232 of the retention bracket 214 and the substrate 204 of the electronic device 200. This is advantageous in minimizing movement of the latch 202 along at least one axis (e.g., minimizing movement along the z-axis).

The composition of the retention bracket 214 may be any known or later developed material. For example, the retention bracket 214 may be made of a metallic or polymeric composition. In some examples, the retention bracket 214 includes one or more metals or metal alloys such as aluminum, copper, iron, lead, magnesium, molybdenum, nickel, osmium, palladium, platinum, rhenium, rhodium, ruthenium, sliver, steel, tantalum, thorium, titanium, vanadium, or alloys thereof. Additionally, or alternatively, the retention bracket 214 may include one or more polymers such as a thermoplastic polymer composition.

The dimensions or size of the retention bracket 214 is also configurable based on the dimensions of the internal cavity of the electronic device 200 and the latch 216. For example, the width and length of the retention bracket 214, as measured along the x-axis and y-axis, respectively, may be within a range of 0.1-200 mm, 1-100 mm, 10-50 mm, 0.1-10 mm, or 1-10 mm. The height of the retention bracket 214, as measured along the z-axis, may be within a range of 0.01-10 mm, 0.1-10 mm, 0.1-5 mm, 1-5 mm, or 0.1-1 mm.

In some examples, a compressible layer or a plurality of compressible layer segments 260 may be positioned on or adjacent to a surface of the retention bracket 214. The compressible layer 260 may be configured to minimize or eliminate movement (e.g., along the z-axis) of the component (e.g., outer substrate) of the electronic device when the component is positioned between the retention bracket 214 and latch 216 and the latch 216 is in a locked position.

The compressible layer 260 may be made of any compressible composition now known or later developed. In some examples, the compressible layer 260 is a foam composition. The foam composition may be an open-cell-structured foam or closed-cell foam. Open-cell-structured foams include pores that are connected to each other and form an interconnected network that is relatively soft. Foam rubber is a type of open-cell foam. Closed-cell foams do not have interconnected pores. Certain examples of closed-cell foams include syntactic foams, which have particles embedded in a matrix material. The spheres can be made from several materials, including glass, ceramic, and polymers. The advantage of syntactic foams is that they have a very high strength-to-weight ratio. One particular syntactic foam employs shape memory polymer as its matrix, allowing the foam to take on the characteristics of shape memory resins and composite materials. That is, the foam has the ability to be reshaped repeatedly when heated above a certain temperature and cooled, which may be advantageous within an electronic device that generates heat during use.

In some examples, the compressible layer 260 may be affixed to the retention bracket 214 by an adhesive layer. The adhesive layer may be made of type of adhesive composition now known or later developed. For example, the adhesive layer may include a non-reactive adhesive composition such as a pressure-sensitive adhesive (PSA), drying adhesive, or contact adhesive. In one example, the adhesive layer includes a pressure-sensitive adhesive having an elastomer compounded with a tackifier (e.g., a rosin ester). The elastomer of the PSA may be an acrylic, butyl rubber, ethylene-vinyl acetate, natural rubber, nitrile, silicone rubber, vinyl ether, or styrene block copolymer (e.g., styrene-butadiene-styrene, styrene-ethylene/butylene-styrene, styrene-ethylene/propylene, or styrene-isoprene-styrene). Advantages of such adhesive materials include their ability to apply strong adhesion between adjacent layers while remaining thin and not adding a relatively high amount of weight to the electronic device.

In some examples, the locking mechanism 212 may include a spring or other return force 262. The spring 262 may be configured to return the latch 216 into its locked position 300 following removal of a thermal or electrical load on the memory wire 218. In other words, the spring 262 is configured to compress when the latch 216 moves from the locked position 300 to the unlocked position 400, and expand when the latch 216 moves from the unlocked position 400 to the locked position 300. The spring 262 moves the latch 216 back to the locked position 300 when the spring return force provided by the compressed spring 262 exceeds an opposite force provided by the memory wire 218. That is, when the thermal or electrical load is removed from the memory wire 218, the memory wire 218 will begin to expand to return to its original shape and the spring force will exceed the force of the expanding memory wire 218 and begin to move the latch 216 back to the locked position 300.

Alternatively, the return force may be a tension spring 272 configured to return the latch 216 into its locked position 300 following removal of the thermal or electrical load on the memory wire 218. The tension spring 272 may be positioned between the substrate 204 or the retention bracket 214 and a portion of the latch 216. The tension spring 272 may be configured to expand when the latch 216 moves into the unlocked position 400. The force within the tension spring 272 is pulling in the opposition direction toward the locked position. Upon removal of the thermal or electrical load on the memory wire 218, this force overcomes the pulling force of the memory wire, and moves the latch 216 back into the locked position 300.

Alternatively, a manual reset post 220 may be attached to the latch via a port or opening in the chassis of the electronic device, wherein a user may pull or otherwise move the latch between its locked position 300 and unlocked position 400. The manual reset post 220 may be detachably connected with one end of the latch 216 adjacent to an external surface of the electronic device 200. The reset post 220 may be positionable through an opening 264 in the external surface of the electronic device 200 to slide the latch 216 along the axis. For example, the post 220 may be used to return the latch 216 back into a locked position 300 where the component of the electronic device 200 is secured in place. Alternatively, the post 220 may be configured to move the latch 216 from the locked position 300 to the unlocked position 400 to release the display module 202 from the electronic device 200. This is advantageous in providing an alternative method of releasing the component other than the memory wire 218.

The composition of the post 220 may be any known or later developed material, including the metallic or polymeric compositions discussed herein. The dimensions or size of the post 220 are also configurable based on the dimensions of an opening in a surface of the electronic device 200 that the post is configured to be inserted through to connect with the latch 216.

The electronic device 200 may also include a heating or electrical component 266 configured to provide a thermal or electrical load to the memory wire 218 to assist in the contraction of the memory wire 218. The heating or electrical component 266 may be a heat source or heating system configured to direct heat toward the memory wire. The heat source may be a battery, processor, or integrated circuit that generates heat during operation of the electronic device 200. The generated heat may be configured to be routed or channeled toward the memory wire 218 upon request to contract the memory wire and move the latch 216 between the locked position 300 and unlocked position 400.

Alternatively, the heating or electrical component 266 may be an electrical circuit connected to the memory wire. Upon receipt of instructions to contract the memory wire 218, a switch of the electrical circuit may be closed, wherein current flows to the conductive memory wire 218. Heat is generated by the current, which causes the memory wire 218 to contract in length to move the latch 216.

As noted above, upon the application of heat or electrical current, the memory wire 218 may undergo a phase change and transition from one phase or crystal structure to another phase, and change in size (e.g., constrict/contract in size). Upon removal of the heat or current, the memory wire 218 may undergo another phase change and transition or return to its original shape.

The electronic device 200 may also include an electrical connector 268 attached to an outer surface of the chassis 204, or configured to be detachably connected to the outer surface of the chassis 204. The electrical connector 268 may be connectable with a separate electronic device that may provide the instructions to the electronic device 200 to unlock the locking mechanism 212 to remove the display module 202. The electrical connector 268 may include any now known or later developed electrical connector. Non-limiting examples include a connector provided on a flexible printed circuit (FPC) or flat flex cable (FFC).

Alternatively, the instructions to unlock the locking mechanism 212 to remove the display module 202 may be wirelessly transmitted by the separate electronic device and received by the processor 210 of the electronic device 200 over a connected network.

In yet another example, the instructions to unlock the locking mechanism 212 may be entered on a touch display screen (e.g., the display module 202) by a user of the electronic device 200, wherein the processor 210 receives the instructions and directs the heating or electrical component 266 to constrict the memory wire to unlock the locking mechanism 212.

Figure 8:
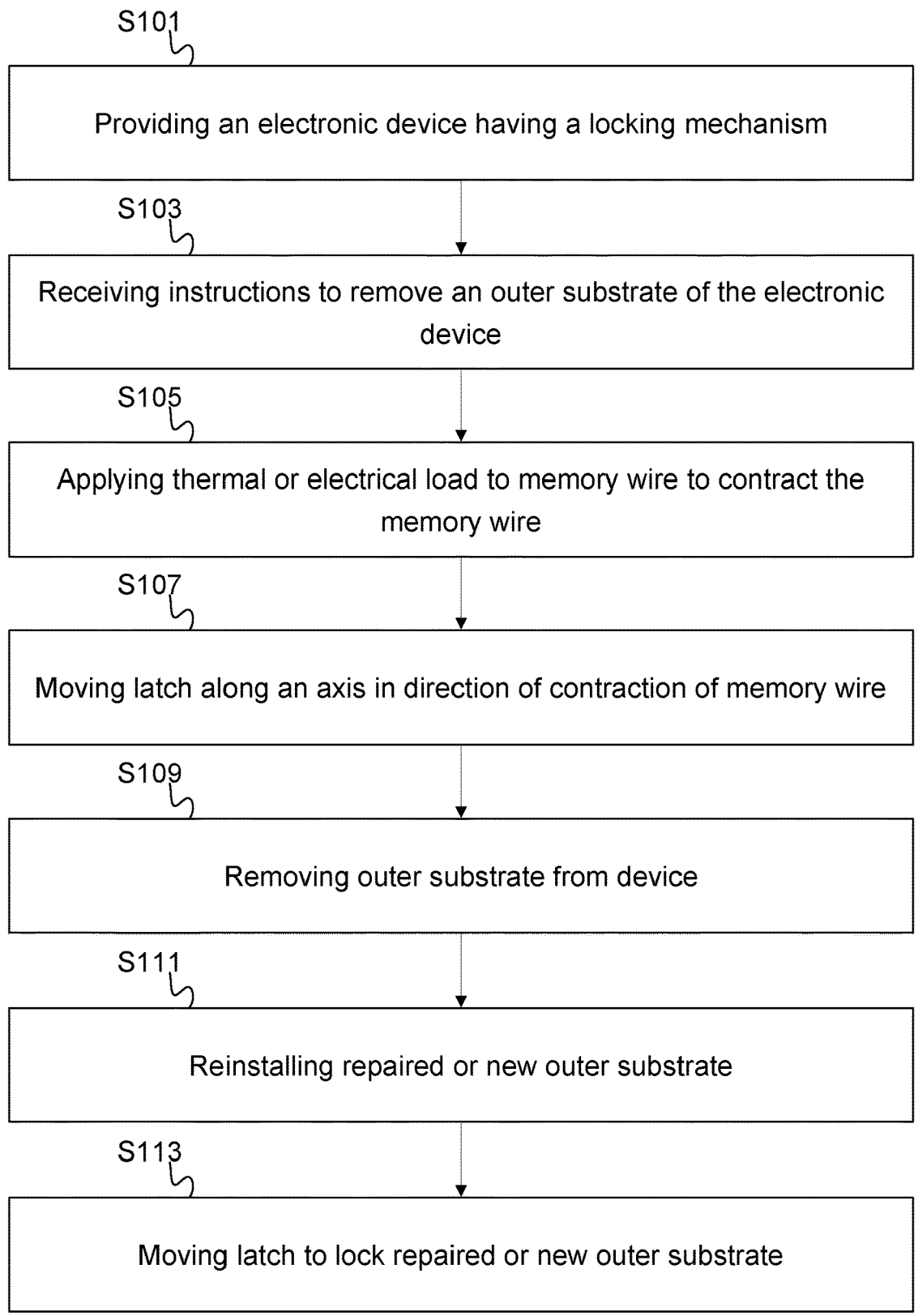
FIG. 8 is a flow diagram of a method of removing a component of an electronic device from the remainder of the device.

FIG. 8 depicts an exemplary method for reconnecting a misplaced electronic device with a mobile computing device. In act S101, an electronic device having a locking mechanism is provided. The locking mechanism is positioned within an internal cavity of the electronic device between a first outer substrate and a second outer substrate. The locking mechanism has a latch and memory wire in communication with the latch. The latch is configured to move between a locked position and an unlocked position, and wherein the first or second outer substrate of the electronic device is secured in the locked position and removable in the unlocked position. The first or second outer substrate may be a display module or a chassis of the electronic device. Additional components of the locking mechanism may also be present (such as a retention bracket, for example), as discussed above with reference to FIGS. 2-7B.

In act S103, an instruction is received by a processor of the electronic device to remove the first or second outer substrate. The instructions may be received wirelessly by a separate device in communication with the electronic device over a connected network. Alternatively, the instructions may be received by entering the instructions on an input component of the electronic device. The input component may be a touchscreen display. In yet another example, a separate device may be physically connected to the electronic device via an electrical connector that links the two devices together and allows a signal to be transmitted between one device to the other. The electrical connector may include any now known or later developed electrical connector. Non-limiting examples include a connector provided on a flexible printed circuit (FPC) or flat flex cable (FFC).

In act S105, the memory wire is contracted or shrunk in length via application of an electrical or thermal load to the memory wire, as discussed above.

In act S107, the latch is moved along an axis in the direction of the contraction of the memory wire such that the latch moves from the locked position to the unlocked position.

In act S109, the first or second outer substrate (e.g. display module) may be physically removed from the remainder of the electronic device by a user.

In act S111, a separate or repaired outer substrate may be reinstalled or inserted into the electronic device. As noted above, this process is advantageous in readily removing and replacing a damaged or broken outer substrate (such as a cracked display module) without physically damaging other components of the electronic device during the removal and reinstallation process.

In act S113, the latch may be returned from the unlocked position to the locked position. This may take place via a removal of the electrical or thermal load to the memory wire, wherein the memory wire expands in length. A spring or other return force may be provided to move the latch into its locked position, wherein the spring return force exceeds an opposite force provided by the memory wire. Alternatively, a manual reset post may be attached to the latch via a port or opening in the chassis of the electronic device, wherein a user may pull or otherwise move the latch to its locked position.

Figure 9:
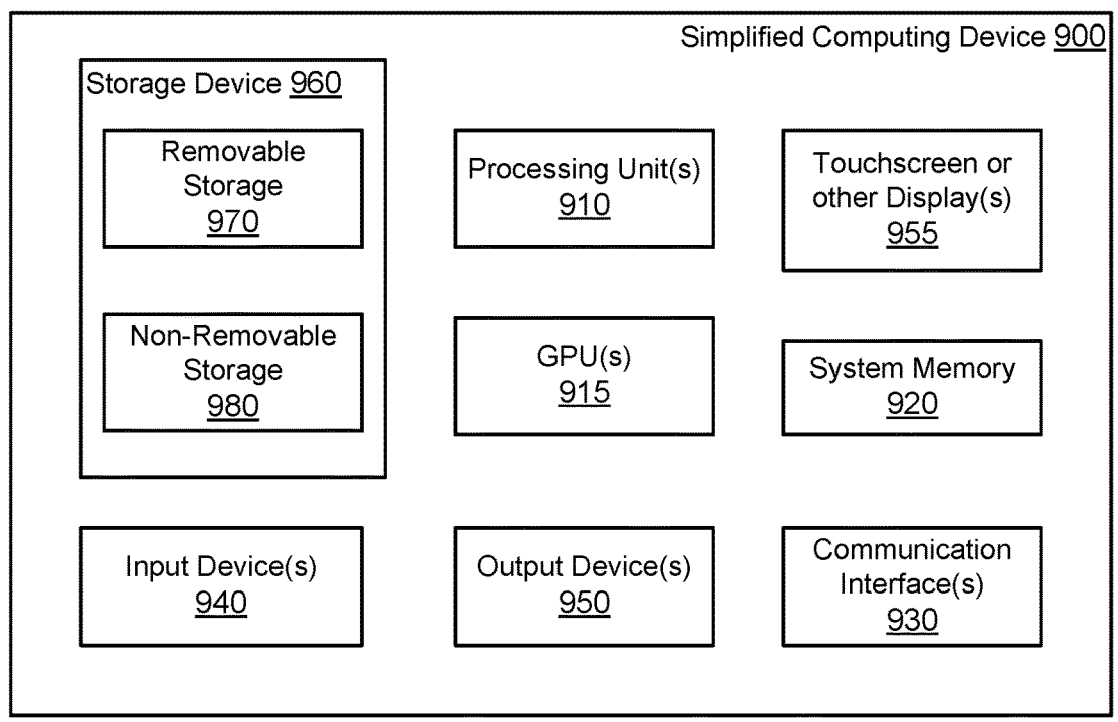
FIG. 9 is a block diagram of a computing environment in accordance with one example of a hybrid electronic device or a component of a hybrid electronic device described herein.

Regarding FIG. 9, the devices described above may be incorporated within an exemplary computing environment 900. The computing environment 900 may correspond with one of a wide variety of electronic or computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, or audio or video media players. In certain examples, the computing device may be a wearable electronic device, wherein the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or head-mounted display.

The computing environment 900 has sufficient computational capability and system memory to enable basic computational operations. In this example, the computing environment 900 includes one or more processing unit(s) 910, which may be individually or collectively referred to herein as a processor. The computing environment 900 may also include one or more graphics processing units (GPUs) 915. The processor 910 and/or the GPU 915 may include integrated memory and/or be in communication with system memory 920. The processor 910 and/or the GPU 915 may be a specialized microprocessor, such as a digital signal processor (DSP), a very long instruction word (VLIW) processor, or other microcontroller, or may be a general-purpose central processing unit (CPU) having one or more processing cores. The processor 910, the GPU 915, the system memory 920, and/or any other components of the computing environment 900 may be packaged or otherwise integrated as a system on a chip (SoC), application-specific integrated circuit (ASIC), or other integrated circuit or system.

The computing environment 900 may also include other components, such as, for example, a communications interface 930. One or more computer input devices 940 (e.g., pointing devices, keyboards, audio input devices, video input devices, haptic input devices, or devices for receiving wired or wireless data transmissions) may be provided. The input devices 940 may include one or more touch-sensitive surfaces, such as track pads. Various output devices 950, including touchscreen or touch-sensitive display(s) 955, may also be provided. The output devices 950 may include a variety of different audio output devices, video output devices, and/or devices for transmitting wired or wireless data transmissions.

The computing environment 900 may also include a variety of computer readable media for storage of information such as computer-readable or computer-executable instructions, data structures, program modules, or other data. Computer readable media may be any available media accessible via storage devices 960 and includes both volatile and nonvolatile media, whether in removable storage 970 and/or non-removable storage 980. Computer readable media may include computer storage media and communication media. Computer storage media may include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which may be used to store the desired information and which may be accessed by the processing units of the computing environment 900.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

Claim Support Section

In a first embodiment, a locking mechanism, positionable within an electronic device, includes: a latch configured to move between a locked position and an unlocked position, wherein a component of the electronic device is secured in the locked position and removable in the unlocked position; and a memory wire in communication with the latch, wherein the memory wire is configured to contract in length to move the latch between the locked position and the unlocked position to release the component of the electronic device.

In a second embodiment, a locking mechanism, positionable within an electronic device, includes: a latch having a first segment, a second segment, and a third segment connecting the first and second segments; a retention bracket configured to be attached to a substrate of the electronic device, wherein a segment of the retention bracket is positioned between the first and second segments of the latch, and wherein the first segment of the latch is positioned between the segment of the retention bracket and the substrate; and a memory wire in communication with the latch, wherein the memory wire is configured to contract to move the latch along an axis in a direction of the contraction of the memory wire to release a component of the electronic device having a segment of the component positioned between the retention bracket and the second segment of the latch.

In a third embodiment, an electronic device includes: a display module; a chassis; a retention bracket positioned between the display module and the chassis, wherein the retention bracket is attached to the chassis; a latch configured to move along a groove provided by the retention bracket between a locked position and an unlocked position, wherein the display module is secured in the locked position and removable in the unlocked position; and a memory wire in communication with the latch, wherein the memory wire is configured to contract to move the latch along the groove in a direction of the contraction of the memory wire.

In a fourth embodiment, with reference to any of embodiments 1-3, the memory wire is configured to contract through application of a thermal load to the memory wire.

In a fifth embodiment, with reference to any of embodiments 1-3, the memory wire is configured to contract through application of an electrical load to the memory wire.

In a sixth embodiment, with reference to any of embodiments 1-5, the (e.g., second segment of the) latch includes at least one hook extending from a surface of the latch in a direction perpendicular to an axis of movement of the latch, the hook is configured to restrict the removal of the component when the latch is in the locked position, and the hook is configured to allow the removal of the component when the latch is moved along the axis into the unlocked position.

In a seventh embodiment, with reference to the sixth embodiment, the hook has a curved outer edge.

In an eighth embodiment, with reference to any of embodiments 1-7, the locking mechanism further includes a retention bracket configured to be attached to a substrate of the electronic device and provide a groove in which a segment of the latch is configured to move between the locked and unlocked positions, wherein the segment of the latch is positioned within the groove between a segment of the retention bracket and the substrate.

In a ninth embodiment, with reference to the eighth embodiment, the locking mechanism further includes a compressible material extending from a surface of the retention bracket, wherein the compressible material is configured to abut the component and restrict movement of the component when the latch is in the locked position.

In a tenth embodiment, with reference to the ninth embodiment, the compressible material is a foam composition.

In an eleventh embodiment, with reference to any of embodiments 1-10, the locking mechanism further includes a post extending from a surface of the latch, wherein an end of the memory wire is connected to the post.

In a twelfth embodiment, with reference to any of embodiments 1-10, the locking mechanism further includes a wheel positioned on or adjacent to a surface of the latch, wherein a section of the memory wire is positioned within a groove of the wheel.

In a thirteenth embodiment, with reference to any of embodiments 1-12, the locking mechanism further includes a spring linearly aligned with an axis of movement of the latch, wherein the spring is configured to provide a force to return the latch into the locked position following movement of the latch between the locked position and the unlocked position.

In a fourteenth embodiment, with reference to any of embodiments 1-13, the locking mechanism further includes a manual reset post detachably coupled with the latch, wherein the manual reset post is configured to return the latch into the locked position following movement of the latch between the locked position and the unlocked position.

In a fifteenth embodiment, with reference to any of embodiments 1-14, the electronic device having the locking mechanism further includes a heating element configured to provide a thermal load to contract the memory wire.

In a sixteenth embodiment, with reference to any of embodiments 1-14, the electronic device having the locking mechanism further includes a circuit configured to provide an electrical current to contract the memory wire.

In a seventeenth embodiment, with reference to any of embodiments 1-16, the electronic device having the locking mechanism further includes a processor configured to receive instructions to move the latch between the locked position and the unlocked position.

What is claimed is:

1. A locking mechanism positionable within an electronic device, the locking mechanism comprising:
    a latch configured to move between a locked position and an unlocked position, wherein a component of the electronic device is secured in the locked position and removable in the unlocked position; and
    a memory wire in communication with the latch, wherein the memory wire is configured to contract in length to move the latch between the locked position and the unlocked position to release the component of the electronic device, the memory wire including a first end and a second end, and wherein the first end and the second end are connected to a substrate of the electronic device.

2. The locking mechanism of claim 1, wherein the memory wire is configured to contract through application of a thermal load to the memory wire.

3. The locking mechanism of claim 1, wherein the memory wire is configured to contract through application of an electrical load to the memory wire.

4. The locking mechanism of claim 1, wherein the latch comprises at least one hook extending from a surface of the latch in a direction perpendicular to an axis of movement of the latch,
    wherein the hook is configured to restrict the removal of the component when the latch is in the locked position, and
    wherein the hook is configured to allow the removal of the component when the latch is moved along the axis into the unlocked position.

5. The locking mechanism of claim 4, wherein the hook has a curved outer edge.

6. The locking mechanism of claim 1, further comprising:
    a retention bracket configured to be attached to a substrate of the electronic device and provide a groove in which a segment of the latch is configured to move between the locked and unlocked positions,
    wherein the segment of the latch is positioned within the groove between a segment of the retention bracket and the substrate.

7. The locking mechanism of claim 6, further comprising:
    a compressible material extending from a surface of the retention bracket, wherein the compressible material is configured to abut the component and restrict movement of the component when the latch is in the locked position.

8. The locking mechanism of claim 7, wherein the compressible material is a foam composition.

9. The locking mechanism of claim 1, further comprising:
    a post extending from a surface of the latch,
    wherein an end of the memory wire is connected to the post.

10. The locking mechanism of claim 1, further comprising:
    a wheel positioned on or adjacent to a surface of the latch,
    wherein a section of the memory wire is positioned within a groove of the wheel.

11. The locking mechanism of claim 1, further comprising:
    a spring linearly aligned with an axis of movement of the latch, wherein the spring is configured to provide a force to return the latch into the locked position following movement of the latch between the locked position and the unlocked position.

12. The locking mechanism of claim 1, further comprising:
    a manual reset post detachably coupled with the latch, wherein the manual reset post is configured to return the latch into the locked position following movement of the latch between the locked position and the unlocked position.

13. A locking mechanism positionable within an electronic device, the locking mechanism comprising:
    a latch having a first segment, a second segment, and a third segment connecting the first and second segments;
    a retention bracket configured to be attached to a substrate of the electronic device,
    wherein a segment of the retention bracket is positioned between the first and second segments of the latch, and wherein the first segment of the latch is positioned between the segment of the retention bracket and the substrate;
    a memory wire in communication with the latch, wherein the memory wire is configured to contract to move the latch along a first axis in a first direction of the contraction of the memory wire to release a component of the electronic device having a segment of the component positioned between the retention bracket and the second segment of the latch; and
    a compressible material extending from a surface of the retention bracket, wherein the compressible material is configured to abut the component and restrict movement of the component along a second axis in a second direction transverse to the first axis and the first direction when the latch is in a locked position.

14. The locking mechanism of claim 13, wherein the second segment of the latch comprises at least one hook extending from the third segment of the latch in a direction perpendicular to the axis of movement of the latch,
    wherein the hook is configured to restrict the release of the component when the latch is in a locked position, and
    wherein the hook is configured to allow the release of the component when the latch is moved along the axis into an unlocked position.

15. The locking mechanism of claim 13, further comprising:

a spring linearly aligned with the axis of movement of the latch, wherein the spring is configured to provide a force to return the latch into a locked position following movement of the latch between the locked position and an unlocked position.

16. The electronic device of claim 13, wherein the retention bracket is removably attached to the chassis.

17. An electronic device comprising:

a display module;

a chassis configured to retain the display module within the chassis in a locked position;

a retention bracket positioned between the display module and the chassis, wherein the retention bracket is attached to the chassis;

a latch configured to move along a groove provided by the retention bracket between the locked position and an unlocked position, wherein the display module is secured in the locked position and removable in the unlocked position; and a memory wire in communication with the latch, wherein the memory wire is configured to contract to move the latch along the groove in a direction of the contraction of the memory wire.

18. The electronic device of claim 17, further comprising:

a heating element configured to provide a thermal load to contract the memory wire.

19. The electronic device of claim 17, further comprising:

a circuit configured to provide an electrical current to contract the memory wire.

20. The electronic device of claim 17, further comprising:

a processor configured to receive instructions to move the latch between the locked position and the unlocked position.

* * * * *